G. W. WEILAND.
MACHINE FOR FORMING DISHES OR RECEPTACLES.
APPLICATION FILED MAR. 8, 1916. RENEWED JUNE 4, 1917.
1,253,316. Patented Jan. 15, 1918.
6 SHEETS—SHEET 1.
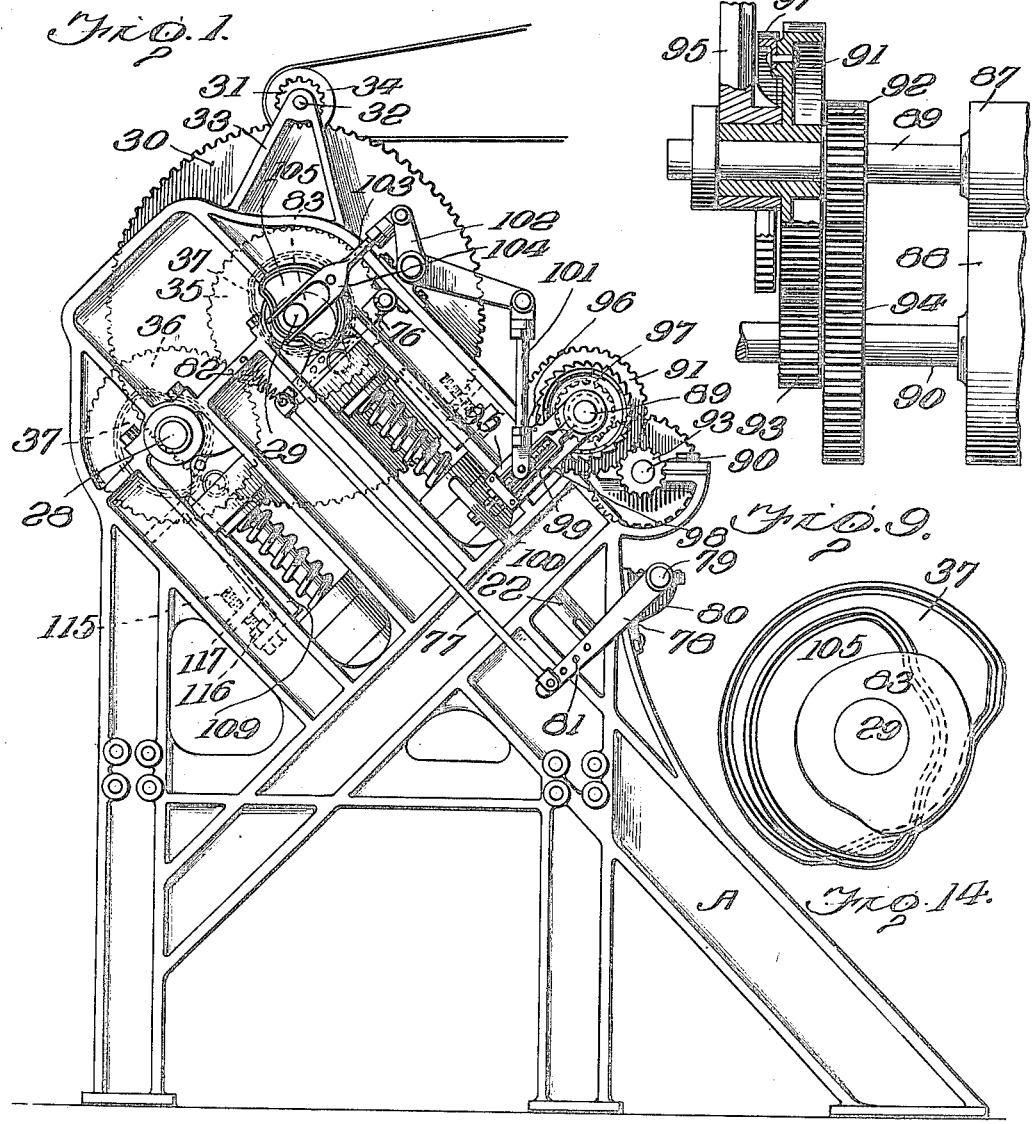
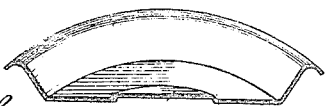

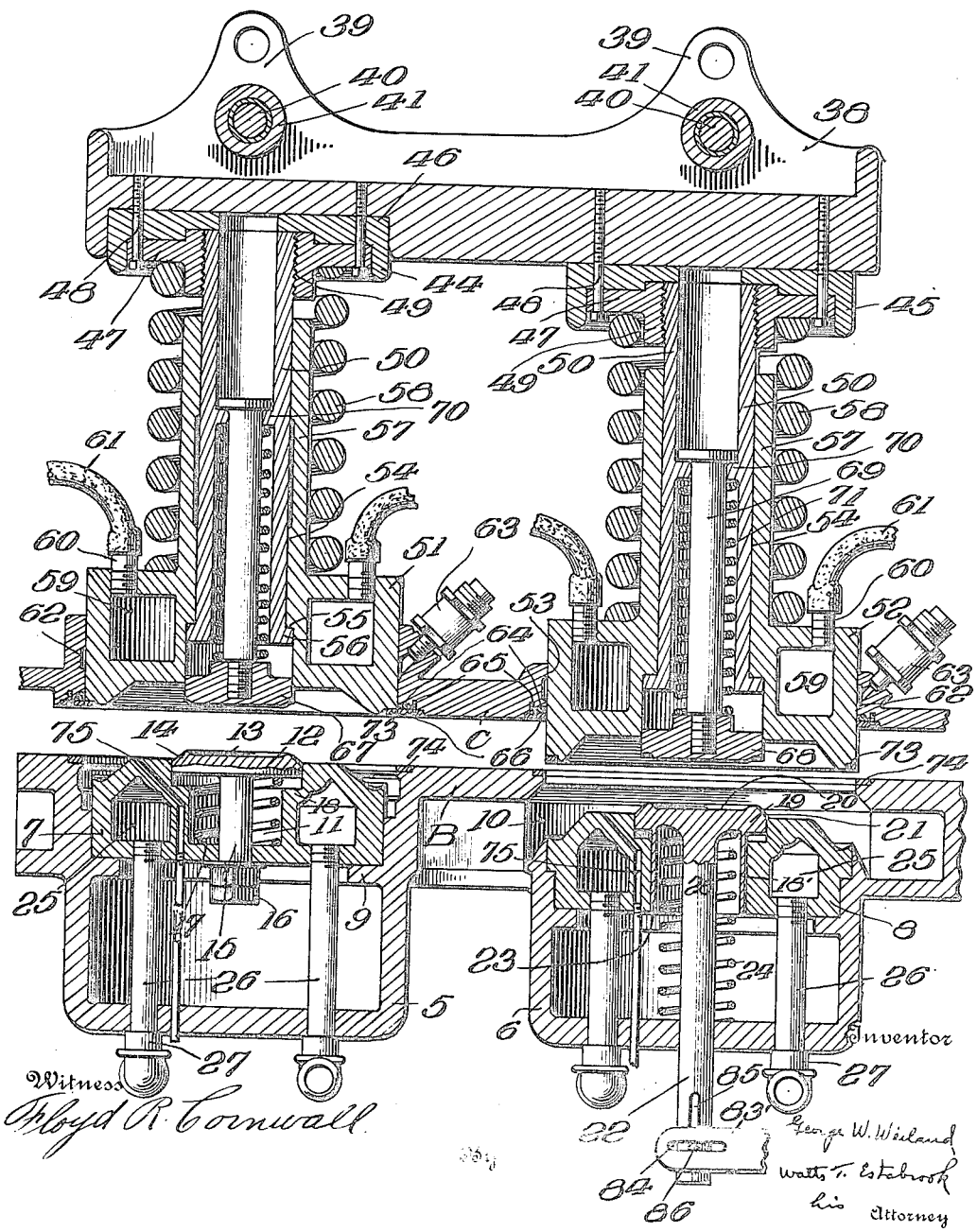

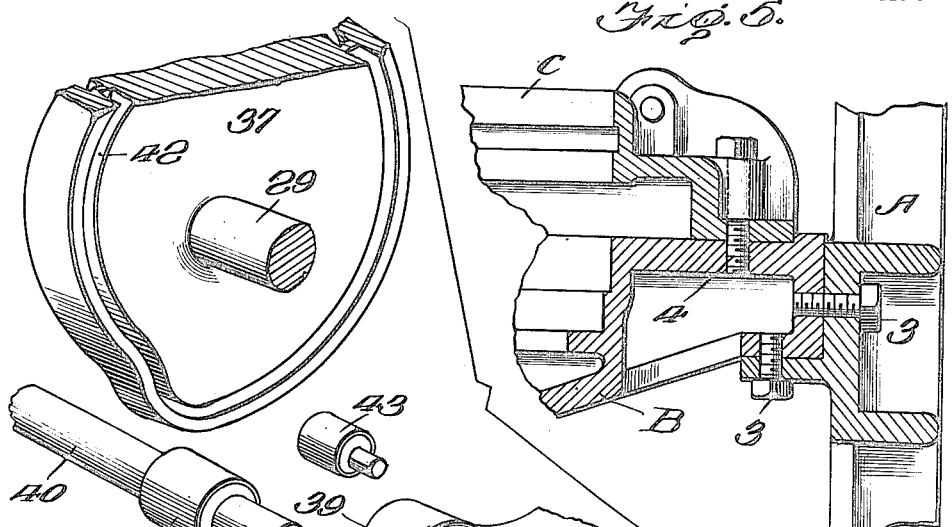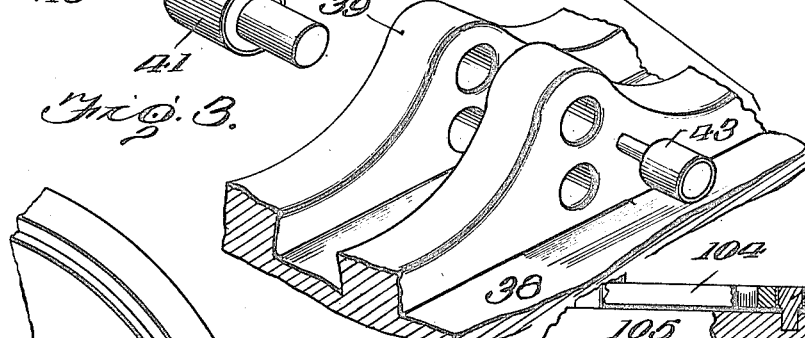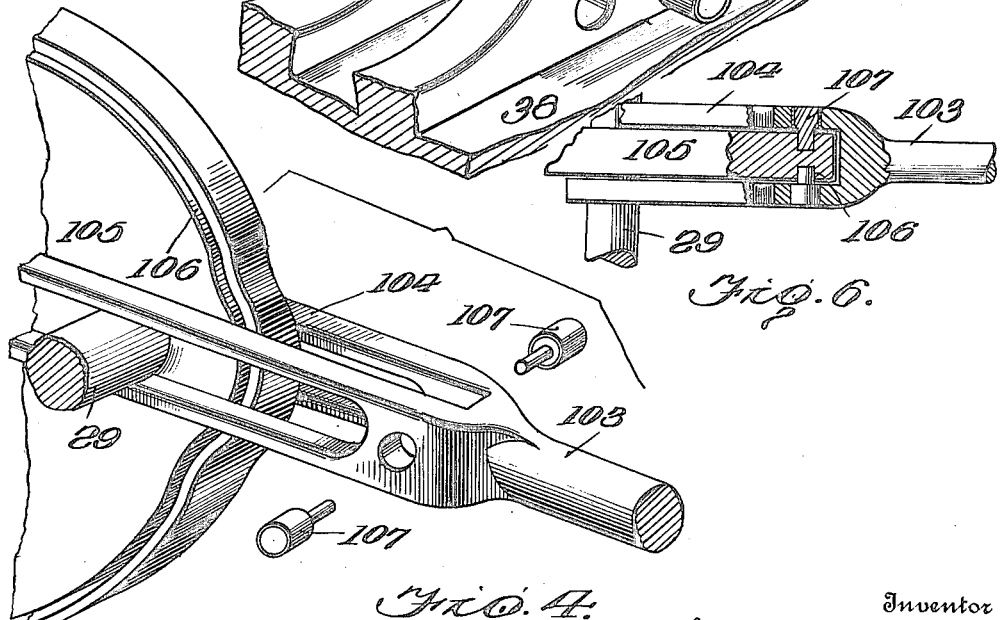

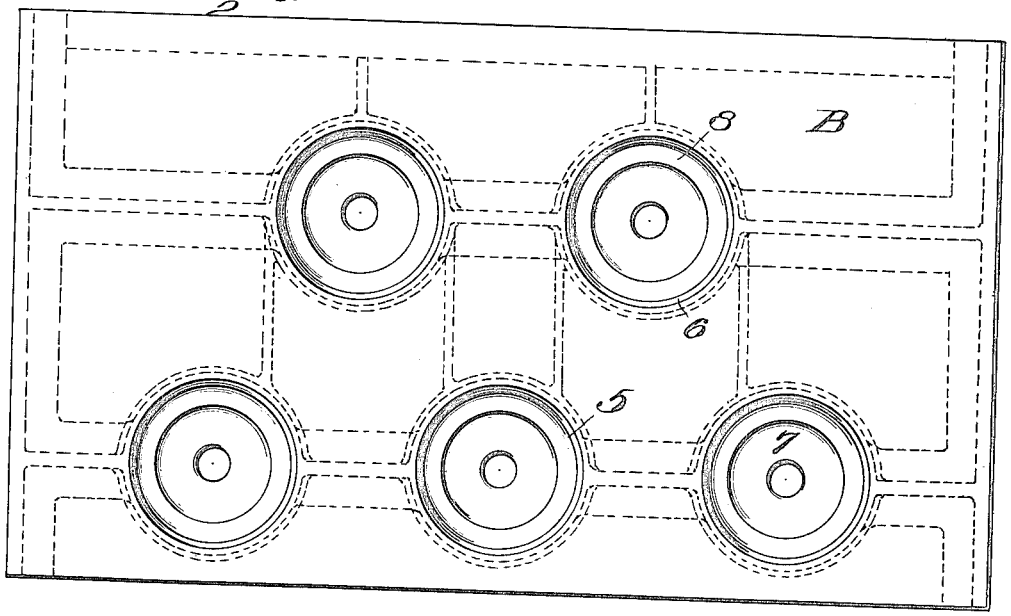
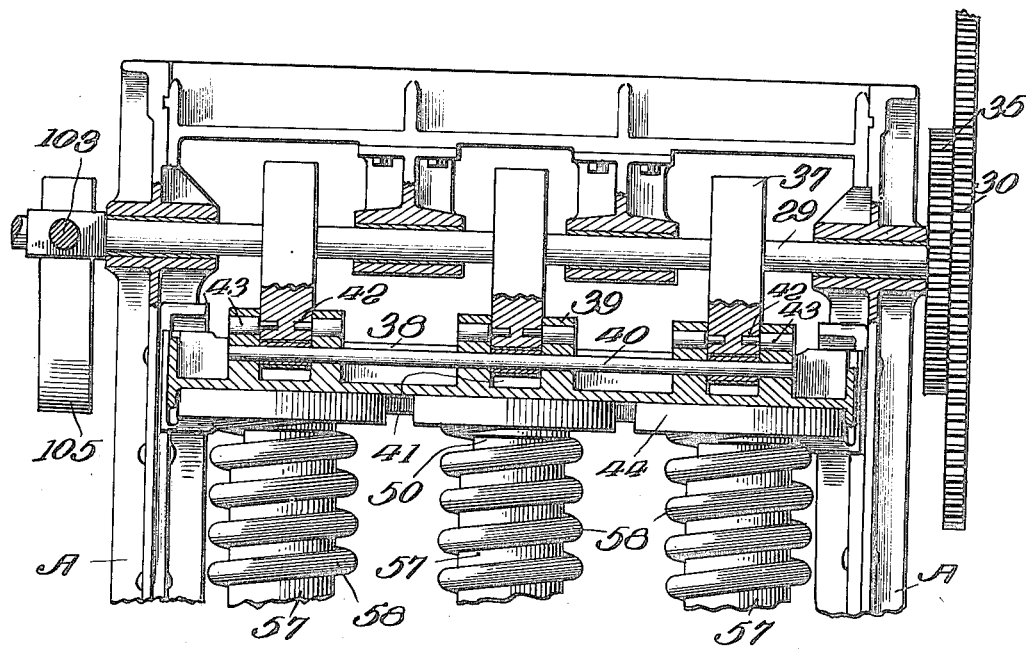

G. W. WEILAND.
MACHINE FOR FORMING DISHES OR RECEPTACLES.
APPLICATION FILED MAR. 8, 1916. RENEWED JUNE 4, 1917.

1,253,316.

Patented Jan. 15, 1918.
6 SHEETS—SHEET 5.

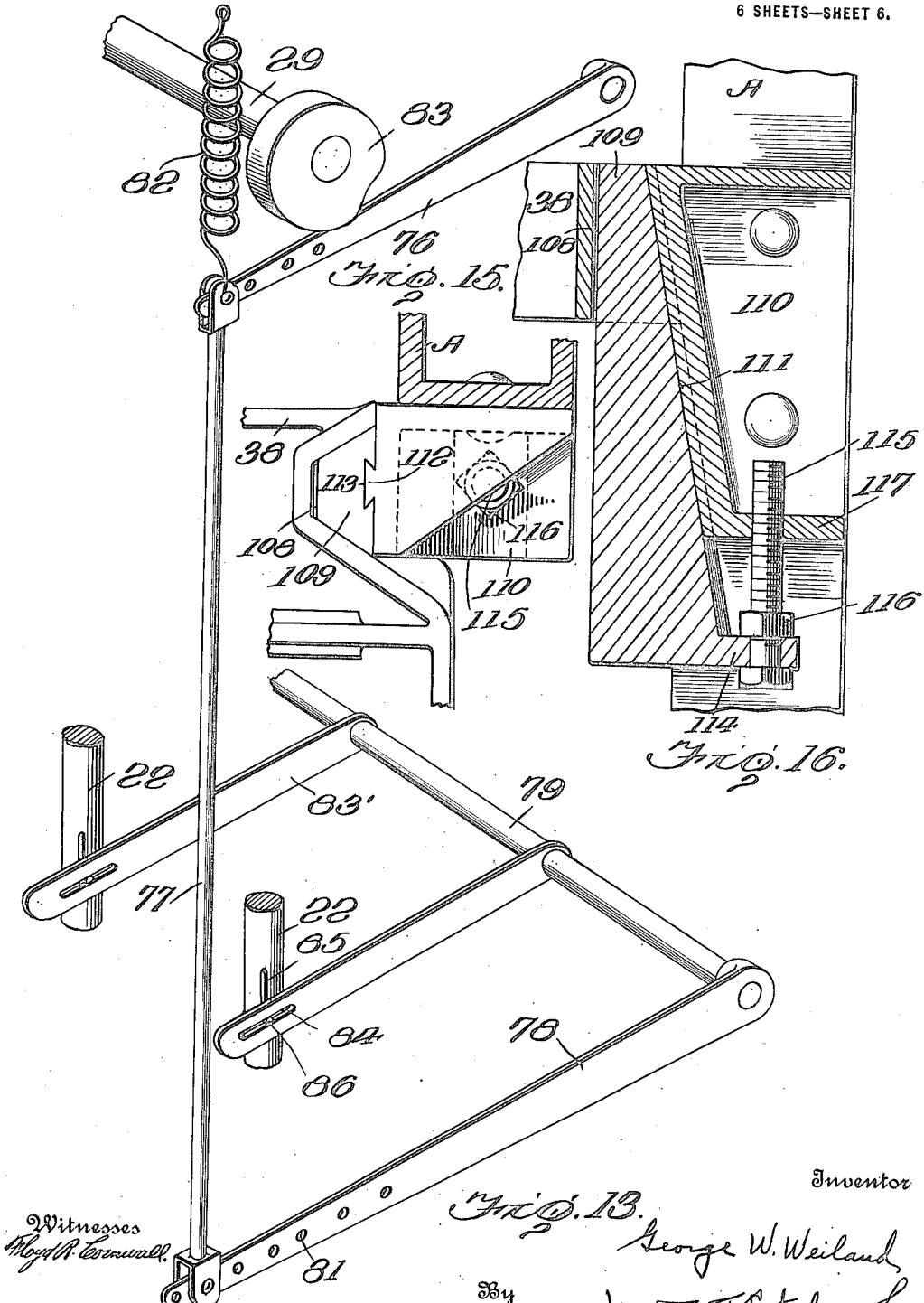

UNITED STATES PATENT OFFICE.

GEORGE W. WEILAND, OF SCRANTON, PENNSYLVANIA, ASSIGNOR OF ONE-THIRD TO E. A. JONES, OF SCRANTON, PENNSYLVANIA.

MACHINE FOR FORMING DISHES OR RECEPTACLES.

1,253,316.  Specification of Letters Patent.  Patented Jan. 15, 1918.

Application filed March 8, 1916, Serial No. 82,957. Renewed June 4, 1917. Serial No. 172,808.

*To all whom it may concern:*

Be it known that I, GEORGE W. WEILAND, a citizen of the United States, residing at Scranton, in the county of Lackawanna and State of Pennsylvania, have invented new and useful Improvements in Machines for Forming Dishes or Receptacles, of which the following is a specification.

This invention relates to an improvement in machines for forming dishes or receptacles from paper or pulp stock, and the object is to provide a plurality of gangs of dies for holding, cutting, and pressing moistened stock in forming a plurality of receptacles at each operation.

The invention consists of holding means which coöperates with the dies and engages the stock prior to the cutting, pressing or forming, and curing or drying operation, so that the stock will be held against movement and the dishes or receptacles properly formed; and the stock cut to the best advantage.

Another feature of the invention is in the arrangement of the gangs of dies, and that is in having the second row of dies located with respect to the first row so that they will present a zig-zag formation, and be sufficiently spaced apart that the stock intervening between the two rows or gangs of dies will produce a row of receptacles, and which will cut from the stock on the next operation of the dies.

A further object of the invention is in the provision of means for ejecting the dishes or receptacles from the machines after each operation without interfering with the feeding of the stock to the dies.

Another object of the invention is in the provision of means for causing the required amount of stock to be fed to the dies for each operation, and which means is operated on the completion of the operation of the dies and when they have moved out of the path of feed of the stock.

The invention consists of certain other novel features of construction and combination of parts which will be hereinafter described and pointed out in the claims.

In the accompanying drawings:—

Figure 1 is a view in end elevation of the machine;

Fig. 2 is a transverse vertical sectional view through the dies, die carriage and cross-head, die guide plate, and bolster die plate;

Fig. 3 is a perspective view showing a portion of the carriage, shaft and one of the operating cams disconnected;

Fig. 4 is a fragmentary perspective view of the paper feeding cam and engaging arm;

Fig. 5 is a detail sectional view showing the manner of connecting the die guide and bolster die plates together and to the frame;

Fig. 6 is a detail sectional view showing the engagement between the paper feeding cam and arm;

Fig. 7 is a top plan view of one form of bolster die plate;

Fig. 8 is a detail longitudinal sectional view through the frame, die carriage and cams for operating the first row of dies;

Fig. 9 is a detail view partly in section of the feed rolls and their driving mechanism;

Fig. 12 is a detail sectional perspective view of a completed dish;

Fig. 13 is a perspective view of the mechanism for locking the holding guides of the lower or stationary dies against movement;

Fig. 14 is an end view showing the cam for operating the holding or gripping guides locking mechanism; the cam for operating the stock feeding mechanism; and one of the rear cams for operating the die carriage;

Fig. 15 is a detail view in top plan showing the die carriage and means for adjusting the position of the carriage within the frame and for taking up the wear on the carriage; and Fig. 16 is a detail vertical sectional view showing the wear take up and the adjusting means.

Figure 10:
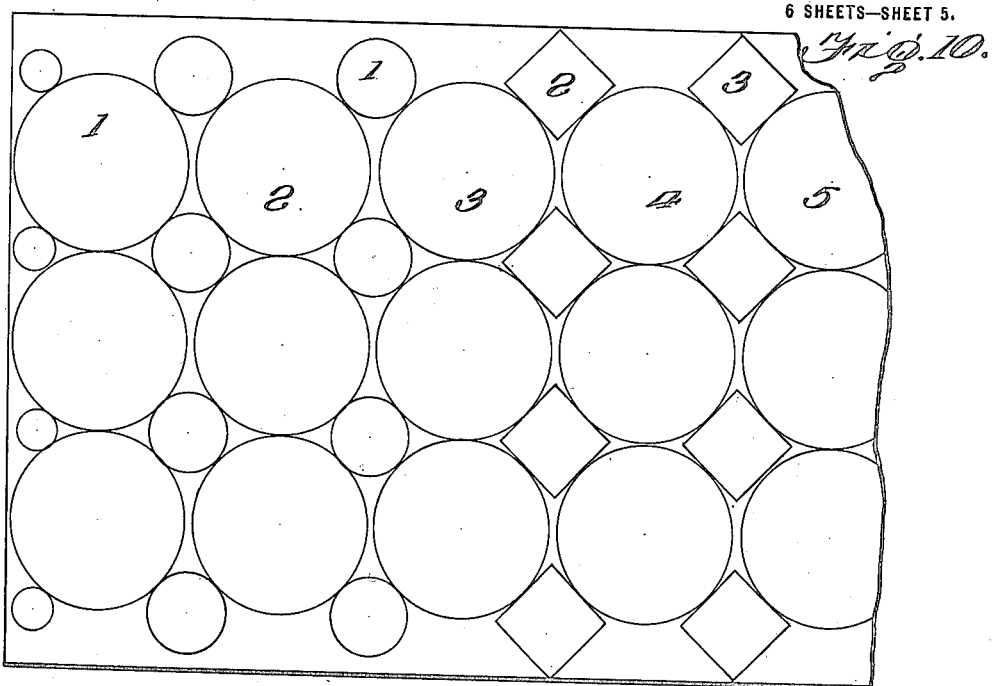
Figs. 10 and 11 are diagrammatic views showing two methods of cutting the stock with the machine with the least amount of waste.

A, represents the frame of the machine, and B, is a bolster die plate mounted on the frame and held in position by means of screw bolts 3, see Fig. 5. Mounted on the die plate B is a guide plate C, which is fastened thereto by screw-bolts 4. The upper face of the plate B and the lower face of the bolster die plate C are supported at their ends on the frame A at an angle of about forty-five (45) degrees.

The bolster die plate B is provided with two rows of pockets 5 and 6, the pockets 6 being located in the rear of the pockets 5 and arranged parallel to the front row of pockets but offset therefrom, so that a zig-zag formation is produced. Mounted in the pockets 5 and 6 on flanges 9, are male or stationary dies 7 and 8 respectively. The dies 8 are mounted lower than the dies 7 so that an opening 10 may be formed in the forward side of each of the pockets 6 at a sufficient elevation that the dishes or receptacles may be discharged from the dies through the openings and beneath the bolster die plate B. Each die 7 is provided with a recess 11, for the reception of a central guide holder or gripping and relieving member 12, the gripping member being provided with a cavity 13 in the face thereof, and the edges of the member are beveled as at 14 from the cavity 13. A stem 15 is connected to each gripping member and extends through the center of the die and has nuts 16 screwed thereon for limiting the movement of the member 12. A spring 17 surrounds the stem 15 and is interposed between the member 12 and the die for normally holding the upper face of the gripping member 12 above the face of the bolster die plate B. A seat 18 is formed in the recess 11 for the gripping member 12 when forced into the recess to limit its movement.

The dies 8 are provided with recesses 18' for the reception of gripping members 19, which are provided with cavities 20 and beveled surfaces 21 on their upper surfaces, similar to the members 12. Stems 22 are connected to each gripping member 19 and extend through the bottoms of the pockets 6. An integral sleeve 23 is formed on the lower surface of each gripping member 19 for guiding the members in their movements. A spring 24 surrounds each stem 22 and is interposed between the lower surface of the member 19 and the bottom of the pocket 6, and normally causes the member to be forced above the top of the bolster die plate B a slight distance.

Each of the dies 7 and 8 are provided with annular heating chambers 25, and connected to the dies are pipes 26 for conducting the heating medium thereto. These pipes pass through pockets 5 and 6 and are provided with collars or nuts 27 for holding the dies in position.

Shafts 28 and 29 are mounted on the frame, and connected to the main shaft 29 is a large driving gear 30, which receives its power from a gear 31 mounted on a stub shaft 32. The shaft 32 is mounted on brackets 33 connected to the frame A, and has a clutch drive pulley 34 thereon which is driven from any suitable source of power. A gear wheel 35 is mounted on the main shaft 29 and meshes with a gear wheel 36 on the secondary shaft 28 for rotating the shaft, but in an opposite direction to the rotation of the shaft 29.

The shafts 28 and 29 have a plurality of cams 37 mounted thereon which are all alike, but the cams on the shaft 28 are reversely mounted to the cams on the shaft 29.

A cross-head or die carriage 38 is received in the frame A and is guided in its movements by the frame. Three rows of ears 39, arranged in pairs, are formed on the upper surface of the carriage, and mounted on the ears of each row is a shaft 40. Mounted on each shaft 40 and interposed between each pair of ears 39 is a roller 41. Received between each pair of ears 39 is a cam 37. The cams are provided on each side with grooves 42 in which are received pins 43, carried by the ears 39 for supporting the carriage 38. When the cams 37 of the shafts 28 and 29 are rotated they will engage the rollers 41 for forcing the carriage 38 downwardly during a degree of their travel, and will with pins 42 in grooves 43 lift the carriage as they continue to rotate.

Connected to the lower surface of the carriage 38 are flanged base plates 44 and 45, the plate 44 being mounted in a recess 46 so that it lies in a higher plane than the plate 45. Centering plates 47 are connected to the plates 44 and 45, and screw-bolts 48 pass through the plates 47, 44 and 45, and into the carriage 38 for fastening the plates in position. The centering plates 47 are provided with central hubs 49 which are internally screw-threaded. Sleeves 50 have screw-threaded engagement with the hubs 49 for supporting the sleeves and permitting of their longitudinal adjustment.

Female or upper movable dies 51 and 52 are mounted to slide in openings 53 formed in the guide die plate C, the dies being arranged in two rows and located above the rows of dies 7 and 8 of the bolster die plate B. Each of the dies 51 and 52 are provided with a central recess or bore 54 in which bore of each die is received a sleeve 50. An annular shoulder 55 is formed in the wall of each bore 54 which is engaged by a flange 56 on the lower terminal of the sleeve 50 for forming a connection between the sleeve and die that the die may be supported by the carriage 38. A sleeve 57 is formed on each die 51 and 52 which surrounds a sleeve 50 for forming a rigid connection between the die and sleeve and at the same time permitting of a sliding engagement between the two, as the sleeve 57 of the die is of less length than the sleeve 50. Compression springs 58 surround the sleeves 57 and are interposed between the upper surface of the dies 51 and 52 and the centering plates 47, the springs tending to normally maintain the dies in the proper position as indicated in Fig. 2. Should any foreign matter or obstruction become accidentally located between any of the male and female dies, the compression springs 58 of such dies will be compressed and make allowance for the obstruction so that the other dies may coöperate and operate upon the stock in forming the receptacle or article.

The dies 51 and 52 are provided with heating chambers 59, and pipes 60 having flexible connections 61 are connected thereto for conducting the heating medium to the chambers. An annular groove 62 is formed in the guide plate C around each die 51 and 52, and oil or grease cups 63 are mounted on the guide plate C and have communication with the grooves 62 for introducing lubricant thereto so that the dies may move freely through the guide plate. A suitable absorbent packing 64 is inserted in a groove 65 around each die 51 and 52, for collecting the lubricant as it issues through the guide plate C. A ring 66 is secured to the guide plate C beneath each packing ring 64 for holding it in the groove 65.

The face of the dies 51 and 52 are preferably recessed in the form of a dish, producing a flat central portion with beveled sides and rounded outer edges, and the faces of the dies 7 and 8 are constructed to conform to the shape of the dies 51 and 52, but are formed in a reverse manner.

Mounted in the bores 57 of the dies 51 and 52 and beneath the flanged portion 56 of the sleeves 57, are gripping and relieving members 67 and 68, to which are connected stems 69, the stems extending into the sleeves 50 and are supported therein on internal flanges 70. Springs 71 surround the stems 69 and are interposed between the gripping members 67 and 68 and the shoulders or flanges 70 for normally forcing the gripping members outwardly or to the position shown in Fig. 2. The faces of the gripping members 67 and 68 conform to the shape of the gripping members 12 and 19 of the male dies 7 and 8, so that their central portions will enter the cavities 13 and 20 of the members 12 and 19, respectively, for gripping and holding the stock after it has been fed into position, so that it may be pressed into shape, cured and cut to produce the desired receptacle. The dies and gripping members shown are adapted to produce a dish shaped like the dish shown in Fig. 12.

As the paper or stock is fed in and prior to the cutting and pressing operation gripping members 19 of the second row of dies 8 of the die bolster plate B will move upward under the action of the springs 24 to a position slightly above the upper surface of the bolster plate B, the gripping members 12 normally being above the surface of the plate B, as indicated in Fig. 2, so that when the dies 51 and 52 are forced downward under the action of the cams 37, the gripping members 12 and 67, of the dies 7 and 51, and the gripping members 19 and 68 of the dies 8 and 52, will first engage the stock or paper and hold it against movement, and as the stock is in a moistened condition, an impression will be made in the stock, for causing the center of the dish to be upset or forced upwardly as indicated at 72 in Fig. 12. After the gripping members have engaged the stock the dies 51 and 52, which are provided with circular knives 73 on their lower faces and at the outer edges thereof, will co-act with the knives 74 on the bolster plate B, which are located at the edges of the pockets 5 and 6, for cutting the stock and producing a dish of the desired size. The dies 51 and 52 continue their downward movement pressing the cut out stock against the faces of the dies 7 and 8, and as the two dies come together the stock is pressed into the shape of the desired dish. The dies are heated and during the pressing operation the dish or cut out stock is dried, so that when the cams 37 due to their continued rotation withdraw the dies 51 and 52 from engagement with the dies 7 and 8 and return them to their normal position for the next operation, the dish is completed, and the gripping members 12 and 19 which have been pressed into the recesses 11 and 18 will move upward under the tension of the springs 17 and 24, respectively, causing the dishes to be lifted from the faces of the dies 7 and 8. The bolster plate B and the machine are arranged at an angle of about forty-five degrees, so that when the dishes are raised from the dies 7 and 8, they will slide from the machine, the dishes on the dies 7 passing down between the plates B and C, and the dishes from the dies 8, passing through the passages or openings 10 formed in the forward sides of the pockets 6. The dishes formed on the dies 8 must necessarily be delivered beneath the plate B, because the stock located between the two rows of dies would interfere with the passage of the dishes between the plates B and C. Compressed air ducts 75 are formed in the dies 7 and 8 for introducing compressed air to the dies for ejecting or assisting in discharging the dishes from the dies.

The mechanism for controlling the action of the gripping members 19 will now be described. A lever 76 is pivotally connected to the frame A, at one end thereof, and pivotally connected to the other terminal of the lever is a connecting rod 77. The rod 77 is pivotally connected to a rocker lever 78, which is connected to a rock shaft 79, the rock shaft being journaled in brackets 80 on the frame A beneath the bolster die plate B. The rocker lever 78 and the lever 76 are provided with a plurality of openings 81 for forming adjustable connections with the rod 77, so that the stroke of the rocker lever may be regulated. A spring 82 is connected to the frame A above the lever 76, and is connected to the rod 77 and lever 76 for holding the lever in engagement with an eccentric cam 83 mounted on the main shaft 29. Connected to the rock shaft 79 are two arms 83' which are provided with elongated slots 84 at their outer ends. The stems 22 of the gripping members 19 are provided with slots 85, and pins 86 pass through the elongated slots 84 and 85 of the arms 83' and stems 22 for loosely connecting the stems and arms together. The cam 83 operates against the lever 76 forcing it downward, thereby causing the rod 77 to actuate the rocker lever 78 for operating the rock shaft 79. The rotation of the rock shaft 79 causes the arms 83' to move downwardly drawing the stems 22 and gripping members 19 therewith, causing the gripping members to be drawn to the position shown in Fig. 2, and beneath the surface of the bolster die plate B, so that they will not interfere with the feeding of the stock or the discharge of the receptacles. It is to be noted that the dies 52 are located closer to the bolster plate B, than the dies 51, and to form sufficient passage for the stock it is necessary to draw the dies 19 beneath the plate B. The cam 83 will upon the completion of the feeding operation, to be presently described, have traveled a sufficient distance to allow the lever 76 to move upwardly, and as it continues to rotate the lever will continue to move and as the lever moves the springs 24 will exert a force against the gripping members 19 causing them to move to a position slightly above the upper surface of the bolster plate so that they will be in a position to coöperate with the gripping members 68 of the dies 52 for gripping the stock prior to the cutting and pressing operations.

The feeding mechanism consists of two rollers 87 and 88, mounted on shafts 89 and 90 journaled on the frame A at the rear side thereof; the shaft 89 has a large and a small gear 91 and 92 mounted thereon, the gear 91 being loosely mounted on the shaft 89, the gears 91 and 92 meshing with a small and a large gear 93 and 94 on the shaft 90, so that the shaft 89 and roller 87 make two revolutions to one revolution of the shaft 90 and roller 88, the number of rotations of one roll with respect to the other being governed by the size of the rolls. A forked arm 95 is loosely mounted on the hub of the gear 91, and is provided with a pawl 96 which is adapted to engage the teeth of a ratchet wheel 97 carried by the gear 91. A screw shaft 98 is mounted and carried by the forked arm 95, and mounted on the shaft 98 is a block 99 which is guided in its movements between forked portions of the arm 95, a wheel 100 being connected to the shaft 98 for adjusting the position of the block 99.

Connected to the block 99 is a link 101 which is pivotally connected to one end of a bell-crank lever 102, the bell-crank lever being fulcrumed on the frame A. A rod 103 is pivotally connected to the other terminal of the bell-crank 102, and is provided with a forked portion 104, which is bifurcated longitudinally and vertically of the rod and longitudinally and horizontally of the rod, and is adapted to fit the main shaft 29 and straddle a cam 105 which is mounted on the shaft 29. The cam 105 is provided with grooves 106 on each side thereof in which pins 107 are received, and which are carried by the forked portion of the rod.

When the shaft 29 is rotated and the cam 105 is rotated it actuates the rod 103, bell-crank 102, link 101, and arm 95, this movement of these parts, assuming them to be in the positions shown in Fig. 1, causes the arm 95 to be drawn upwardly causing the pawl 96 to engage a tooth of the ratchet wheel 97, for rotating the gears 91—92—93—94 and the shafts 89 and 90. The rotation of the shafts causes the feed rollers 87 and 88 to revolve and feed the stock and paper to the machine for the cutting and forming operation. The cam is so constructed that it will feed the desired amount of stock to the machine, and upon the completion of this operation, and as the cam continues to rotate the rod 103, bell-crank 102, link 101 and arm 95 will be returned to their normal position, or in a position for the next feeding operation.

Upon the completion of the feeding operation the cam 83 will be releasing the stems 22 of the gripping members 19 so that they will assume their proper position above the upper surface of the bolster plate B in time to coöperate with the gripping members 68 of the dies 52, which are being fed downward by the cams 37. When the cams 37 have caused the dies 51 and 52 to be operated for producing the cutting and forming operation, and are causing the dies to be lifted by the continued rotation of the cams by the engagement of the die carriage 38 with the cams 37 through the pins 43, the cam 83 will be moved to a position for causing the rock shaft 79 to operate the gripping members 19 and cause them to be held in a lowered position and prevented from moving upward under the tension of the springs 24. The cam 105 will also have traveled to a position for causing the feeding rollers 87 and 88 to be rotated for feeding a new supply of stock into position for another operation.

The carriage 38 is provided with a wedge-shaped recess 108 at each of its four corners, and received in the recesses 108 are wedges 109, see Figs. 1, 15 and 16.

Brackets 110 are mounted on the frame A, and are provided with beveled faces 111, which taper downwardly, and formed on the faces 111 of each bracket is a dove-tailed tongue 112. The outer face of each wedge 109 is beveled and tapers upwardly conforming to the face 111 of the bracket, and the face of the wedge is provided with a dove-tailed groove 113 which receives the tongue 112 of the bracket 110.

A lug 114 is formed at the lower end of each wedge, and projects outwardly beneath a flange 117 on the bracket 110. A bolt 115 extends through each lug 114 and is fastened thereto by a nut 116, the bolt being adapted to have screw-threaded engagement with the flange 117 of the bracket, so that the wedges 109 may be caused to travel along the faces of the brackets upon the turning of the bolts 115 for causing the carriage to be properly centered in the frame and for taking up the wear between the wedges and carriage due to the travel of the carriage along the wedges.

In cutting the dishes or receptacles from the stock, it is to be noted that the two rows of dies are not directly behind each other so that the stock is cut from both dies along the lines of cutting of each row of dies, but instead a space intervenes between the two rows of dies, so that a positive cut is produced, and when the stock is fed for the next operation, the first row of dies will cut the stock into disks for forming the receptacles, which was located between the two rows of dies on the previous operation. In this way, it is possible to cut the stock with little or no waste, and a body is presented to the dies for each operation which permits of the stock being cut closer to a preceding cut than would be possible if the rows of dies were arranged contiguously to each other. Furthermore, it is preferred to have them arranged in a zig-zag fashion, than having the dies arranged directly one behind the other.

Figure 11:
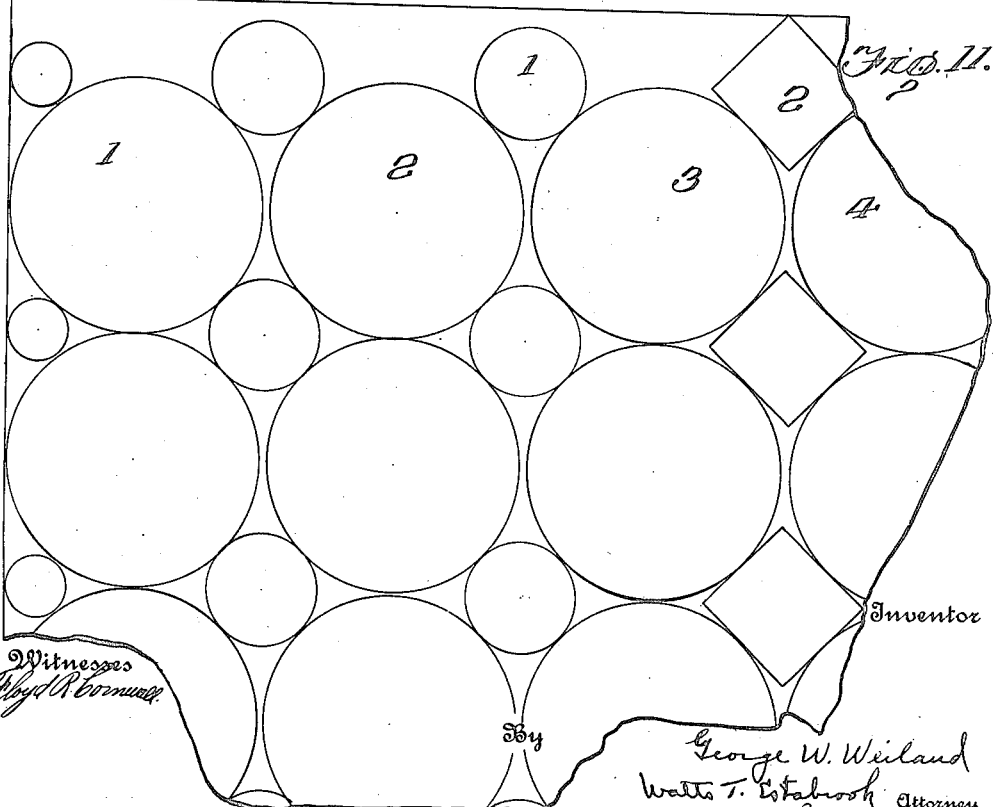

The dies are shown all of one size, yet it is the intention to make the dies of the second row in some instances smaller, it depending upon the sizes of the articles to be formed. In Figs. 10 and 11 is disclosed two diagrams showing how it is possible to cut the stock to the best advantage and for making different sizes of dishes or receptacles. In the diagrams it is indicated by numerals just what portions of the stock would be removed at each operation. For instance, by referring to either figure, two rows of disks numbered 1, are to be found, which indicates that on the first operation these disks will be cut, and on the second operation the disks numbered 2. will be cut, and so on.

With the present invention the cutting and forming is produced at a single operation of the dies, and the same mechanism which operates the dies operates the feeding mechanism, and they are all timed so that they perform their function without conflicting with one another.

The bolster die plate B and the guide die plate C, are capable of being removed and plates substituted therefor having openings and pockets of various sizes for various sizes of dies. The dies may also be removed from the carriage and dies of other sizes than those shown substituted, for instance, the first row might be composed of large sized dies and the second row of dies of a smaller size.

While only two rows of dies are shown, it is not the intention to be limited to any particular number of rows, as more may be employed and the die guide plate and bolster die plate, which are removable, may be constructed for use in connection with as many rows of dies as desired, regardless of the arrangement of the rows of dies with respect to each other.

The stroke or pressure exerted by the dies upon the stock in forming the articles may be regulated by springs of the proper size, and in cases where the stock is of greater density the dies will be shaped to accommodate the stock.

What I claim is:—

1. In a dish making machine, the combination of a plurality of rows of stationary and movable dies, a bolster plate for supporting the stationary dies, and means provided for discharging the dishes from a row of said stationary dies beneath the bolster plate so that the dishes will not interfere with the feeding of the stock to the dies.

2. In a dish making machine, the combination with a frame, of a carriage movably mounted in the frame, movable dies carried by the carriage, stationary dies mounted on the frame coöperating with the movable dies, and adjustable wedges mounted on the frame for guiding and maintaining the carriage centered in the frame.

3. The combination with a frame, of a plurality of rows of stationary and movable dies, means for actuating the movable dies, a bolster plate for supporting the stationary dies, the inner row of said stationary dies being located beneath the bolster plate so that the articles formed thereon may be discharged from the machine without interfering with the feeding of the stock to the dies, and means provided for discharging the articles from said row of stationary dies beneath the bolster plate.

4. In a dish making machine, the combination of a plurality of rows of stationary and movable dies, a bolster plate for supporting the rows of stationary dies, gripping members carried by the dies, cams for operating the movable dies, means for feeding stock to the machine, a row of gripping members of the stationary dies being adapted to project above the bolster plate to co-act with the gripping members of the adjacent movable dies, and cam controlled means for holding the other row of gripping members of the other row of stationary dies at a position so that the stock may be fed onto the bolster plate.

5. In a dish making machine, the combination of a plurality of rows of stationary and movable dies, a bolster plate for supporting the rows of stationary dies, gripping members carried by the dies, the gripping members of the stationary dies projecting above the surface of the bolster plate, means for feeding stock onto the bolster plate to be operated on by the dies, means for holding the gripping members of the secondary row of dies beneath the bolster plate during the feeding operation so that the gripping members will not interfere with the feeding of the stock, and means for operating the movable dies, said gripping members being adapted to engage the stock prior to the action of the dies on the stock for holding the stock against movement, said holding means being adapted to release the gripping members of the secondary row of dies upon the completion of the feeding operation.

6. In a dish making machine, the combination of a plurality of rows of stationary and movable dies, a bolster plate having rows of pockets in which the stationary dies are supported, gripping members carried by the dies, and adapted to project above the surface of the bolster plate, means for feeding stock onto the bolster plate to be acted on by the dies, means for operating the movable dies for causing them to coöperate with the stationary dies for cutting and forming dishes from the stock, said gripping members being adapted to engage and hold the stock during the operation thereon by the dies, said pockets having openings therein through which the completed dishes are discharged.

7. In a dish making machine, the combination of a plurality of rows of stationary and movable dies, a bolster plate having rows of pockets in which the stationary dies are supported, means for feeding stock to the bolster plate to be operated on by the dies for forming dishes therefrom, a row of said pockets having openings therein through which the completed dishes are ejected.

8. In a dish making machine, the combination of a plurality of rows of stationary and movable dies, a bolster plate having rows of pockets in which the stationary dies are supported, means for feeding stock to the dies to be operated on for making dishes, spring actuated gripping members carried by the dies and adapted to engage the stock operated on by the dies and hold it during the action of the dies, one of the rows of pockets having openings in the sides thereof through which the completed dishes may be discharged, said gripping members of the stationary dies being adapted to raise the completed dishes from the stationary dies to permit of their discharge from the machine, and means for limiting the movement of the gripping members of the dies of the row of pockets having side openings that the dishes may be discharged.

9. In a dish making machine, the combination of a plurality of rows of stationary and movable dies, means for feeding stock to the dies to be operated on for making dishes, gripping members carried by the dies adapted to engage the stock for holding it during the operation of the dies thereon, a main and an auxiliary shaft having cams thereon for operating the movable dies, a cam on the main shaft for operating the feeding means, means for holding the gripping members of the inner row of stationary dies out of the path of travel of the stock during the feeding operation, and a cam on the main shaft for operating said holding means.

10. In a dish making machine, the combination with rows of dies for cutting and forming dishes from stock, and means for feeding stock to the dies, said dies being spaced apart longitudinally and transversely of the machine for forming an intervening uncut portion of stock between the dies longitudinally and transversely of the machine after each cutting operation, and the first row of dies being adapted to cut said intervening portion of stock into dishes on the next operation of the machine.

GEO. W. WEILAND.